United States Patent [19]

Krtolica et al.

[11] Patent Number: 5,539,840
[45] Date of Patent: Jul. 23, 1996

[54] MULTIFONT OPTICAL CHARACTER RECOGNITION USING A BOX CONNECTIVITY APPROACH

[75] Inventors: Radovan V. Krtolica, MountainView; Sofya Malitsky, Palo Alto, both of Calif.

[73] Assignee: Canon Inc., Tokyo, Japan

[21] Appl. No.: 138,864

[22] Filed: Oct. 19, 1993

[51] Int. Cl.$^6$ .................................................. G06K 9/46
[52] U.S. Cl. ........................................ 382/195; 382/204
[58] Field of Search ................................. 382/27, 26, 19, 382/30, 33, 34, 38, 39, 40, 9, 195, 204

[56] References Cited

U.S. PATENT DOCUMENTS

| | | | |
|---|---|---|---|
| 3,760,356 | 9/1973 | Srivastava | 340/146.3 |
| 3,846,752 | 11/1974 | Nakano et al. | 340/146.3 |
| 3,930,231 | 12/1975 | Henrichon, Jr. et al. | 382/30 |
| 3,993,976 | 11/1976 | Ginsburg | 340/146.3 |
| 4,225,850 | 9/1980 | Chang et al. | 340/146.3 |
| 4,241,329 | 12/1980 | Bahler et al. | 340/146.3 |
| 4,346,405 | 8/1982 | Yoda et al. | 358/105 |
| 4,513,441 | 4/1985 | Henshaw | 382/43 |
| 4,547,800 | 10/1985 | Masaki | 358/107 |
| 4,547,898 | 10/1985 | Tsikos | 382/4 |
| 4,628,533 | 12/1986 | Hongo et al. | 382/27 |
| 4,754,489 | 6/1988 | Bokser | 382/40 |
| 4,783,838 | 11/1988 | Matsunawa | 382/51 |
| 4,799,270 | 1/1989 | Kim et al. | 382/27 |
| 4,817,176 | 3/1989 | Marshall et al. | 382/43 |
| 5,224,179 | 6/1993 | Denker et al. | 382/55 |
| 5,271,068 | 12/1993 | Veda et al. | 382/30 |

OTHER PUBLICATIONS

A. Khotanzad and J. Lu, *Classification of Invariant Image Representations Using a Neural Network*, 38 IEEE Transactions on Acoustics, Speech, and Signal Processing 6, pp. 1028–1038, Jun. 1990.

J. Loncelle, et al., *Optical Character Recognition and Cooperating Neural Networks Techniques*, Artificial Neural Networks, 2, I. Aleksander and J. Taylor, Ed., Elsevier Science Publishers, B. V., 1992.

S. N. Srihari et al., *Pattern Recognition, Character Recognition and Optical Character Readers*, Technical Report CEDAR-TR-91-1, Center for Document Analysis and Recognition, State University of New York at Buffalo, Buffalo, NY, May 1991.

R. Krtolica, B. Warner, "Morphological approach to machine printed character recognition: a feasibility study," *Machine Vision Applications in Character Recognition and Industrial Inspection*, SPIE, vol. 1661, 10–12 Feb. 1992, San Jose, California, pp. 106–117.

Krtolica, "Multicriteria Character Classification Using Pareto Optimality" Feb. 1993 pp. 238–245.

Current et al, "An Interactive Approach to Identify the Best Compromise Solution." 1990 pp. 187–198.

Lefkovitch, "Optimal Attributes Sets for Identification". Jan. 1987, pp. 69–83.

*Primary Examiner*—Leo Boudreau
*Assistant Examiner*—Chris Kelley
*Attorney, Agent, or Firm*—Stuart P. Meyer; Edward J. Radlo

[57] ABSTRACT

Pattern recognition, for instance optical character recognition, is achieved by defining a minimal bounding rectangle around a pattern, dividing the pattern into a grid of boxes, comparing a vector derived from this partitioned pattern to vectors similarly derived from known patterns, choosing a set of Pareto non-inferior candidate patterns, and selecting a recognized pattern from the set of candidates. The vectors include pixel density matrices, matrices of horizontal connectivity of boxes, and matrices of vertical connectivity of boxes.

9 Claims, 5 Drawing Sheets

MULTIFONT OPTICAL CHARACTER RECOGNITION USING A BOX CONNECTIVITY APPROACH

FIELD OF THE INVENTION

The present invention relates generally to image processing and specifically to recognition of patterns, such as optical characters, by partitioning a detected pattern into a grid of boxes and comparing the connectivities and pixel densities of such boxes to corresponding connectivities and pixel densities from referent patterns.

DESCRIPTION OF RELATED ART

Numerous schemes have been proposed for pattern recognition in the past. A great deal of research and development has occurred, particularly in the area of optical character recognition (OCR). See, for example, S. N. Srihari, V. Govindaraju, J. J. Hull, R. K. Fenrich and S. Lam, "Pattern Recognition, Character Recognition and Optical Character Readers", Technical Report CEDAR-TR-91-1, Center for Document Analysis and Recognition, State University of New York at Buffalo, Buffalo, N.Y., May 1991.

Known schemes for OCR vary widely in their approaches. Some early attempts superimposed bit maps of detected images over templates of known characters. Such schemes were extremely sensitive to such factors as font differences, skewing, enlargement, and reduction. Other approaches concentrated on extracting particular features from detected characters. Results varied depending on the particular selection and processing of features.

U.S. Pat. No. 3,846,752 to Nakano et al. discloses character recognition apparatus using the density distribution of a character. The frequency spectrum of the density distribution is compared to that of density distributions corresponding to known characters, and the known character with the Fourier transform spectrum pattern most similar to that of the detected character is output as the recognized character.

U.S. Pat. No. 4,817,176 to Marshall et al. discloses another pattern recognition scheme using Fourier transformation, with various corrections for amplitude and phase differences.

U.S. Pat. No. 3,930,231 to Henrichon, Jr., et al. discloses use of a multiple cell grid for detection of pattern density and feature recognition. A vector signal is generated for a detected character based on the presence or absence of each recognizable feature, and this vector is compared with vectors representing known characters.

U.S. Pat. No. 3,993,976 to Ginsburg discloses pattern analysis using a transform to obtain spatial frequencies. The spatial frequencies are filtered to extract pattern information for determining general form, edge, texture, and depth information of the detected pattern.

U.S. Pat. No. 4,513,441 to Henshaw discloses comparison of two images by forming a composite overlay of the images and examining phase differences therein.

In other arts, U.S. Pat. No. 4,225,850 to Chang et al. discloses use of Fourier transform techniques to detect regions of an image field not containing fingerprint images. U.S. Pat. No. 4,547,800 to Masaki discloses detection of positional deviations of workpieces by making parallel transformations and rotations on workpiece images and making comparisons with reference image information. U.S. Pat. No. 4,346,405 to Yoda et al. discloses detection of temporal changes in television images by dividing a television screen into blocks and processing X-Y data for visual information therein. U.S. Pat. No. 4,241,329 to Bahler et al. discloses speech recognition using spectral statistics to recognize a keyword in a continuous audio signal. U.S. Pat. No. 3,760,356 to Srivastava discloses a technique for determining, within a set of binary numbers, an extreme binary number.

Neural networks have also been applied to the task of OCR. In J. Loncelle, et al., *Optical Character Recognition and Cooperating Neural Networks Techniques*, ARTIFICIAL NEURAL NETWORKS, 2, I. Aleksander and J. Taylor, Ed., Elsevier Science Publishers, B.V., 1992, and in A. Khotanzad and J. Lu, *Classification of Invariant Image Representations Using a Neural Network*, 38 IEEE TRANSACTIONS ON ACOUSTICS, SPEECH, AND SIGNAL PROCESSING 6, pp. 1028–1038, June 1990, neural network-based OCR systems are described.

None of these teachings provides an adequately robust technique for recognizing optical characters or other patterns as corresponding to one of a known set of patterns in situations where the image is corrupted by a significant amount of noise. To improve upon the performance of OCR systems, it would be desirable to have a robust, computationally simple, technique for recognition. Since any single method of recognition suffers from certain inadequacies, it would also be desirable to have a technique to further increase the reliability of recognition by combining several alternative and redundant recognition procedures, the combination of such procedures being more reliable than any one of them alone.

DISCLOSURE OF INVENTION

In accordance with the present invention, a detected pattern is recognized among a set of known template patterns by partitioning each of the template patterns into a grid of boxes, determining at least one characteristic metric for each grid, such as a vertical adjacency matrix, a horizontal adjacency matrix, or a pixel density matrix; scanning an image to obtain the detected pattern, partitioning the detected pattern into the grid of boxes, comparing the metrics for the detected pattern and the templates, and recognizing the image in response to a minimum distance of the metrics.

In one aspect of the invention, the metrics used for each of the templates and the detected image include three matrices: a horizontal adjacency matrix indicating connectivity among the boxes in a horizontal dimension; a vertical adjacency matrix indicating connectivity among the boxes in a vertical dimension; and a pixel density matrix, indicating pixel density in each of the boxes.

In another aspect of the invention, a Hamming distance is determined between the respective matrices of the detected image and each of the templates.

In yet another aspect of the invention, candidates for recognition are selected from the templates based on the vectors of Hamming distances from the detected image matrices to the corresponding templates satisfying conditions of Pareto-optimality, i.e., non-inferiority.

In still another aspect of the invention, the image is recognized by selecting among the candidates based on geometric properties of the minimal bounding frame and probability of each candidate in the context of other recognized images.

Figure 1:
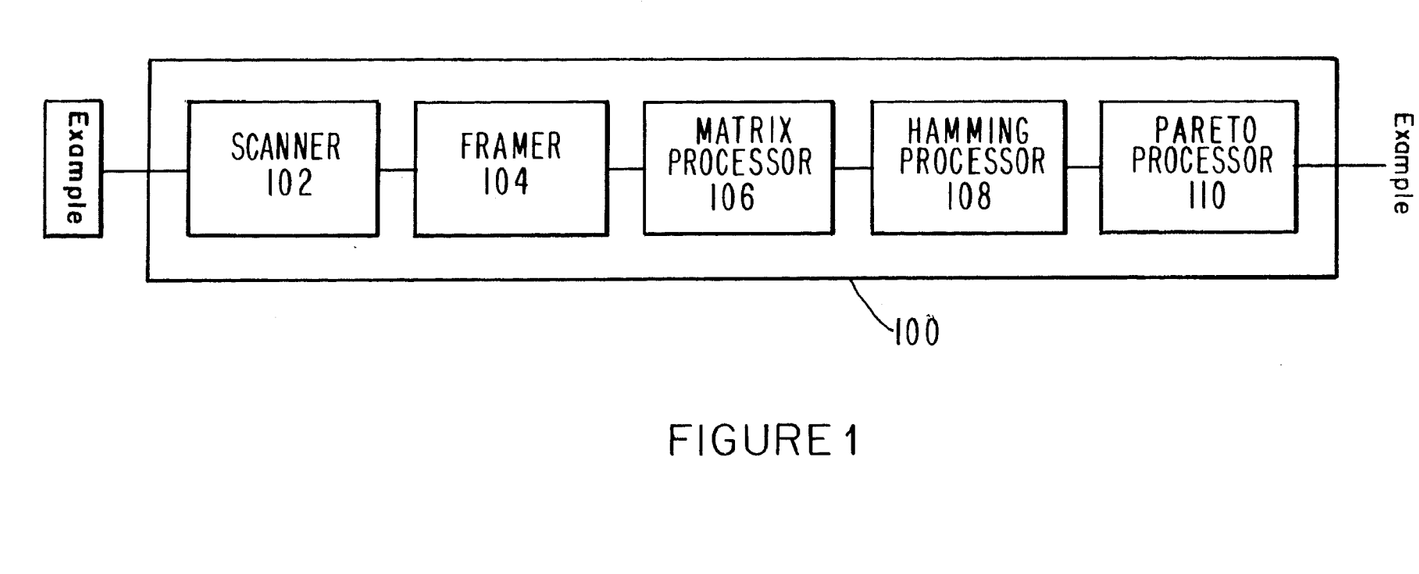
FIG. 1 is a functional block diagram of apparatus for pattern recognition in accordance with the present invention.

In accordance with the present invention, apparatus (100) for pattern recognition includes a scanner (102), a framer (104), a matrix processor (106), a Hamming processor (108) and a Pareto processor (110).

BEST MODE FOR CARRYING OUT THE INVENTION

Referring now to FIG. 1, there is shown a system 100 for pattern recognition in accordance with the present invention. Briefly, the system 100 is comprised of five major functional blocks. Scanner 102 is used to obtain a two-dimensional array of pixel values representing the scanned image, including the pattern to be recognized. Framer 104 detects the pattern by separating it from other image elements and framing it by a minimally bounding rectangle. Matrix processor 106 performs processing on the detected pattern to generate a horizontal adjacency matrix, a vertical adjacency matrix, and a pixel density matrix. Hamming processor 108 takes as input the matrices produced by matrix processor 106, compares those matrices with matrices from template patterns, and produces a distance vector for each pairing of corresponding matrices from the detected pattern and one of the templates. Pareto processor 110 takes as input the distance vectors produced by Hamming processor 108, selects as candidates for recognition those templates producing distance vectors that are Pareto-optimal, i.e., non-inferior, and, if there is more than one such candidate, chooses one of the candidates as the recognized pattern.

Figure 2:
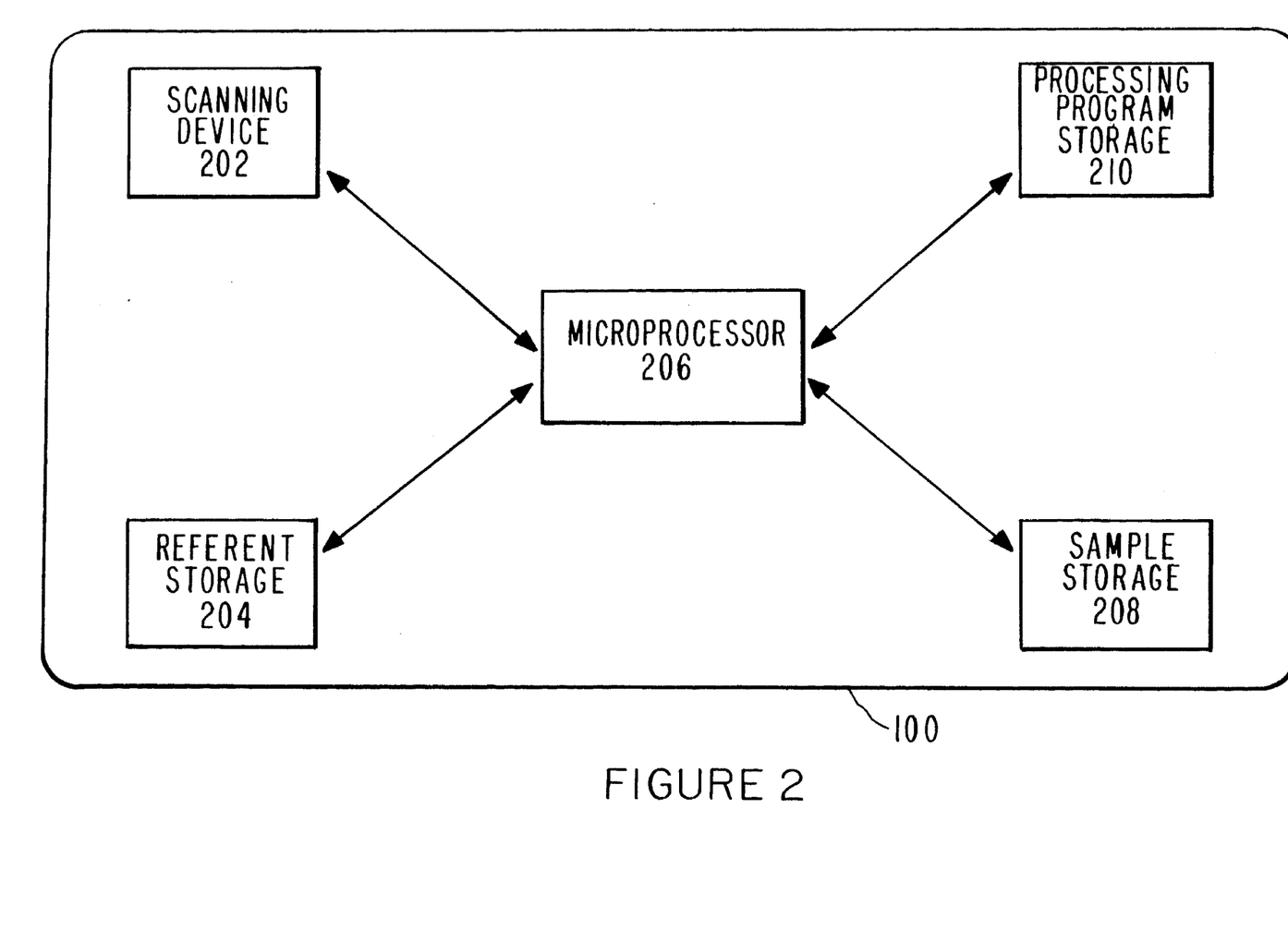
FIG. 2 is a physical block diagram of the apparatus of FIG. 1, in accordance with the present invention.

Referring now also to FIG. 2, there is shown a physical block diagram of system 100 indicating components used to implement the functionality of the blocks 102, 104, 106, 108, 110 shown in FIG. 1. In a preferred embodiment, scanner 102 is implemented by a scanning device 202, specifically a "ScanJet IIc" model digital scanner from Hewlett Packard Co., which provides a resolution of 400 dots (pixels) per inch, each pixel being quantized with an eight-bit gray scale resolution. Framer 104, matrix processor 106, Hamming processor 108 and Pareto processor 110 are each implemented by microprocessor 206, in conjunction with referent storage 204, sample storage 208, and processing program storage 210. In a preferred embodiment, a conventional general-purpose 66 MHz IBM-compatible personal computer with a type 80486 microprocessor is used for microprocessor 206, referent storage 204, sample storage 208 and processing program storage 210. It should be recognized that a number of alternative physical devices and implementations could readily be used to provide the functionality illustrated in FIG. 1.

Figure 3:
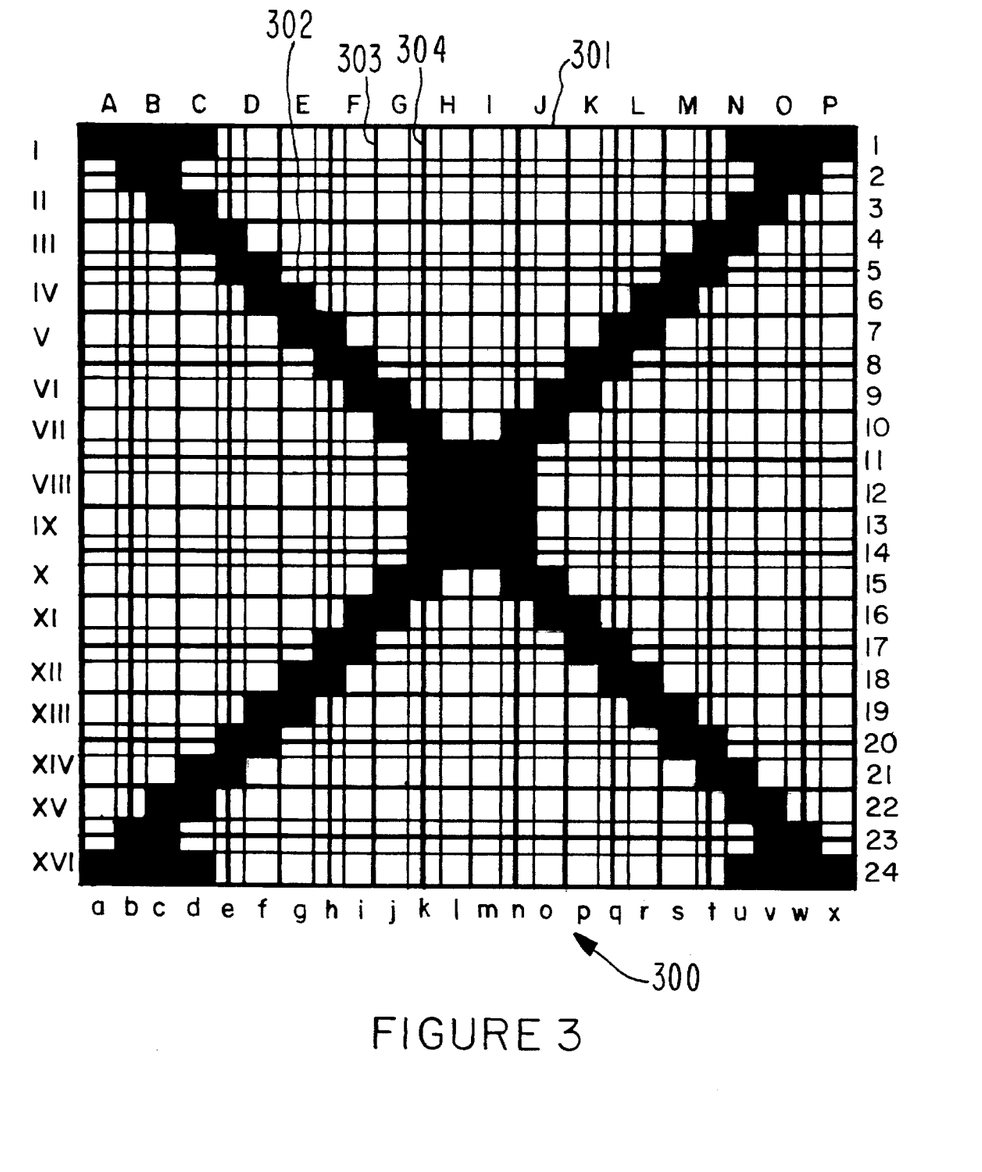
FIG. 3 illustrates a minimally bounded character bitmap partitioned into a grid of boxes, in accordance with the present invention.

Referring now to FIG. 3, there is shown a character bitmap 300 of the letter "x". Such a bitmap 300 may be obtained by operation of scanner 102 and framer 104. In operation, scanner 102 obtains a pixel-by-pixel representation of an image on a scanned object, typically a piece of paper. Commonly, such an object will have an image that consists of a number of discrete patterns. For example, FIG. 1 illustrates application of an image consisting of the word "Example" to scanner 102. Framer 104 uses conventional segmentation techniques to separate a scanned image into its constituent discrete patterns, e.g., the patterns corresponding to the letters "E", "x", "a", "m", "p", "l", and "e". Framer 104 also determines a minimum bounding rectangle 301 that contains each such discrete image. Minimum bounding rectangle 301 is defined as the smallest rectangle that completely contains a discrete pattern, e.g., the pattern corresponding to the letter "x". Because patterns produced by a scanner are represented on a pixel-by-pixel basis, a minimal bounding rectangle 102 will have boundaries that coincide with the pixel boundaries provided by the representation of such patterns provided by scanner 102. In other words, a minimal bounding rectangle will be an integer number of pixels wide and an integer number of pixels tall. In FIG. 3, pixels, e.g., 302 of bitmap 300, are denoted by relatively thin lines and are referenced by arabic numerals and lower-case letters. Thus, FIG. 3 illustrates a case in which a minimum bounding rectangle for a pattern of the letter "x" is 24 pixels high and 24 pixels wide. For purposes of discussion herein, pixels are each assumed to be represented by a single-digit binary number, with white and black being used to distinguish pixels having a value of 0 from pixels having a value of 1. It should be recognized, however, that gray-scale or color representations in which pixels are represented by multiple binary digits or where multiple values are used to represent a pixel may readily be used in accordance with the present invention.

Once a minimal bounding rectangle 301 is defined around a bitmap 300, the bitmap 300 is partitioned into a grid of boxes. In FIG. 3, such boxes are denoted by relatively thick lines and are referenced by roman numerals and uppercase letters. For purposes of illustration, FIG. 3 illustrates a partitioning in which bit map 300 is divided into a grid 16 boxes wide by 16 boxes high. In a preferred embodiment, every bitmap, e.g., 300, is divided into a grid 16 boxes high by 16 boxes wide. It should be recognized, however, that the partitioning need not be square, i.e., the same number of boxes in each dimension, and that the particular number of boxes used may vary as desired. It should also be noted that once a desired number of partitions is determined, that number of partitions may be used regardless of the size of the minimal bounding rectangle. For example, the bounding rectangle 301 for a typical bitmap of a letter "x" in 10 point type may be 31 pixels high and 29 pixels wide, while the bounding rectangle for a bitmap of a letter "x" in 18 point type may be 57 pixels high and 55 pixels wide. In either event, however, the resulting bitmap 300 is partitioned into the same number of boxes for processing. Since the size of a detected pattern is effectively normalized by this partitioning, separate templates are not typically required for recognition of characters having different font sizes and may not be required for characters having different styles, e.g., boldface, or different type fonts.

Figure 4:
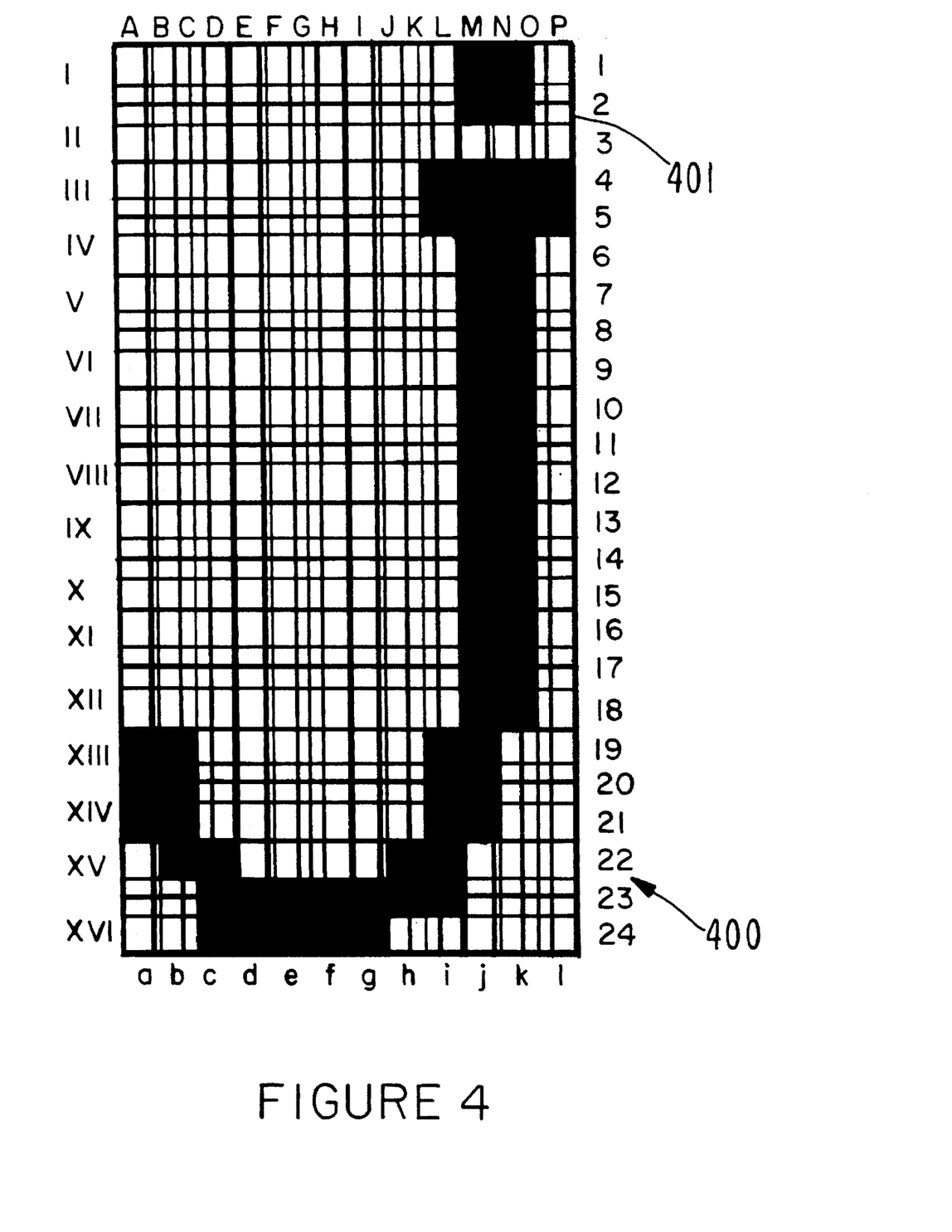
FIG. 4 illustrates a second minimally bounded character bitmap partitioned into a grid of boxes, in accordance with the present invention.

The explanation above is exemplified by the illustration of FIG. 4. In FIG. 4, there is shown a second character bitmap 400, this bitmap 400 representing the letter "j". In this example, the letter "j" has the same height, 24 pixels, as the letter "x" of FIG. 3, so both the minimum bounding rectangle 301 of bitmap 300 and the minimum bounding rectangle 401 of bitmap 400 are 24 pixels high. However, the letter "j" in this example is narrower than the letter "x" of FIG. 3. Specifically, the minimum bounding rectangle 401 is only 12 pixels wide while the minimum bounding rectangle 301 is 24 pixels wide. Nevertheless, bitmap 400 is still partitioned into a grid 16 boxes wide by 16 boxes high, as indicated by relatively bold lines and referenced by roman numerals and capital letters on FIG. 4.

Figure 5:
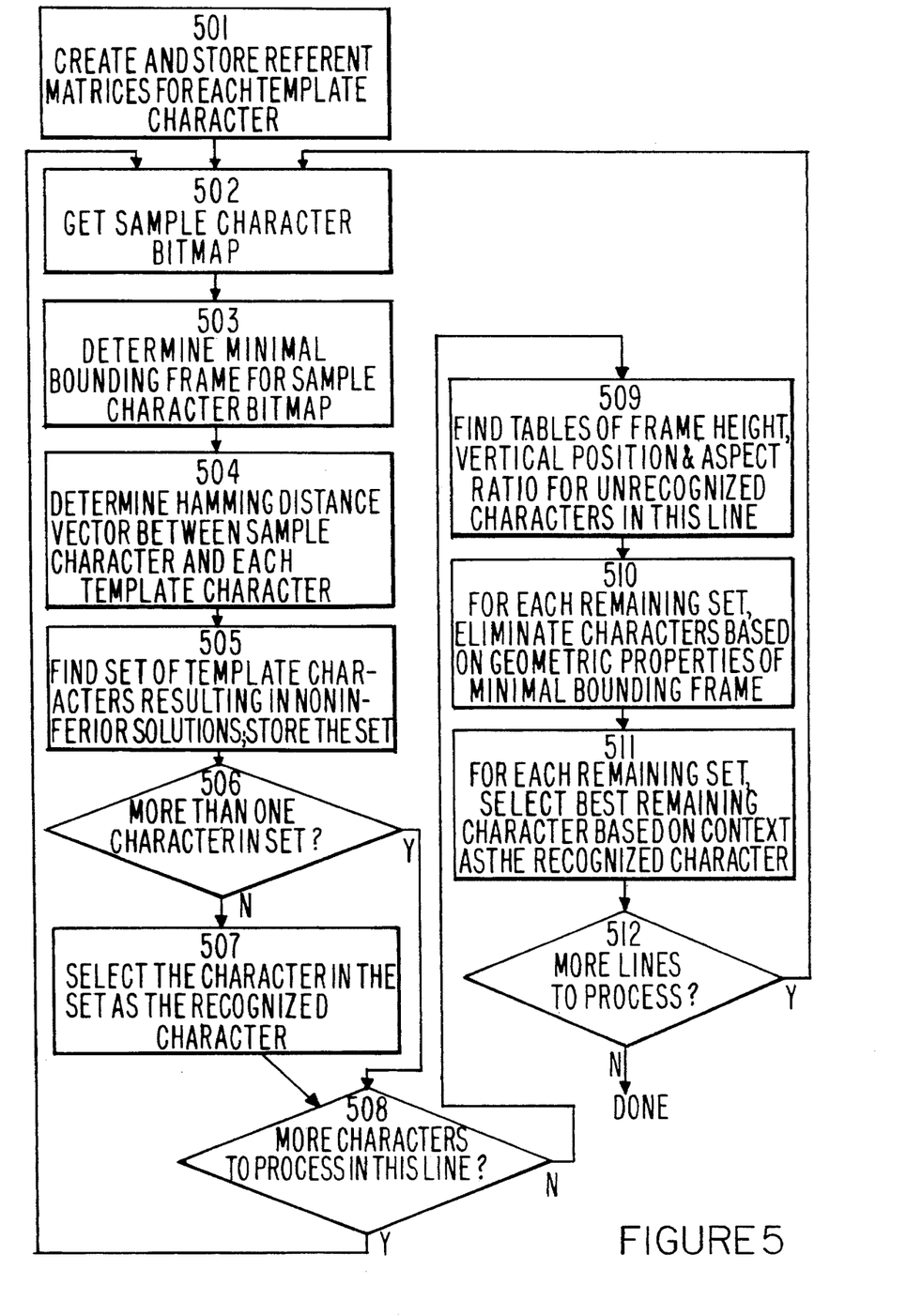
FIG. 5 is a flow diagram illustrating processing used for pattern recognition, in accordance with the present invention.

Referring now to FIG. 5, there is shown a flow diagram for optical character recognition in accordance with the present invention. Processing begins 501 by creating and storing referent matrices for each template character in a template set. A template set may include printable characters for one or more sizes, styles, and fonts of type. In a preferred embodiment, a single template set is used for 12-, 10-, and 8-point sizes of a particular type font. Each such printable character is represented as a bit map of a size defined by a minimal bounding rectangle, such as the bitmaps 300 and 400 of FIGS. 3 and 4, respectively. Each such bitmap is partitioned into a grid of boxes as described in connection with FIGS. 3 and 4.

In a preferred embodiment, three matrices are created from the bitmap of each template character. Assume for purposes of discussion that a pixel value of 1 refers to a black portion of an image and a pixel value of 0 refers to a white portion of an image. A horizontal adjacency matrix is created to indicate whether horizontally adjacent boxes are connected, as described below. Referring now again to FIG. 3, to determine connectivity, two cases are considered: (a) the case where a dividing line, e.g., 304, between boxes, e.g., I-G and I-H, crosses one or more pixels, e.g., 1-k (fractionated boundary layer); and (b) the case where a dividing line, e.g., 303 does not cross pixels (non-fractionated boundary layer).

In case (a), illustrated by boxes I-G and I-H in FIG. 3, pixels 1-k and 2-k on the dividing line 304 and the nearest pixels 1-j, 2-j, 1-l, 2-l, from both sides of the dividing line 304 are considered. Described below is an analysis of connectivity for such a case, with the corresponding analysis for a horizontal rather than vertical dividing line indicated in parentheses. For a vertical (horizontal) dividing line 304, the pixels 1-k, 2-k on the line 304 are first considered together with the pixels 1-j, 2-j in the nearest left (upper) column (row) j. This set of pixels, called a "boundary layer," consists of two columns (rows) j, k, and as many rows (columns) as there are pixels, or parts of pixels, in one column (row) of the box, in this case, 2. The boxes I-G and I-H are considered connected if at least one pair of pixels in one of the rows (columns) of the boundary layer has both pixels on, i.e., equal to 1. If there is no such pair of pixels, the next boundary layer is considered, i.e., the set of pixels in column k and in the nearest right (lower) column (row), in this case column 1. Thus, this second boundary layer consists of pixels 1-k, 2-k and 1-l, 2-l. The boxes I-G and I-H are considered connected if at least one pair of pixels in one of the rows (columns) of this boundary layer has both pixels on. Thus, if either of the two boundary layers has at least one such pair of pixels that are on, the boxes I-G and I-H are connected.

In case (b), illustrated with regard to boxes I-F and I-G, a single boundary layer is considered, composed of pixels 1-i, 2-i, 1-j, 2-j nearest to dividing line 303. Boxes are connected if at least one of the two-element rows (columns) of the boundary layer has both of its pixels on.

With connectivity thus defined, a horizontal adjacency matrix for an n×n grid of boxes may be defined as a matrix of n rows and n-1 columns, with each entry in the matrix set to 1 if the corresponding box is connected to the next box toward the right. Only n-1 columns are required for such a matrix, since under this convention there is no need to separately represent connectivity for the right-most column of boxes. Using the example of the bitmap 300 of FIG. 3, since box I-A and box I-B are connected, a corresponding entry for the horizontal connectivity matrix would be 1. Box I-B and box I-C are similarly connected, so the corresponding entry for the matrix would also be 1. However, box I-C and box I-D are not connected, so the corresponding matrix entry would be 0. The entire horizontal adjacency matrix for the bitmap 300 of FIG. 3 would therefore be:

```
1 1 0 0 0 0 0 0 0 0 0 0 0 0 1 1
1 1 0 0 0 0 0 0 0 0 0 0 0 0 1 1
0 0 1 0 0 0 0 0 0 0 0 0 0 1 0 0
0 0 1 1 0 0 0 0 0 0 0 1 1 0 0
0 0 0 0 1 0 0 0 0 0 1 0 0 0 0
0 0 0 0 1 1 0 0 0 1 1 0 0 0 0
0 0 0 0 0 0 1 1 1 0 0 0 0 0 0
0 0 0 0 0 0 1 1 1 0 0 0 0 0 0
0 0 0 0 0 0 1 1 1 0 0 0 0 0 0
0 0 0 0 0 0 1 1 1 0 0 0 0 0 0
0 0 0 0 1 1 0 0 0 1 1 0 0 0 0
0 0 0 0 1 0 0 0 0 0 1 0 0 0 0
0 0 1 1 0 0 0 0 0 0 0 1 1 0 0
0 0 1 0 0 0 0 0 0 0 0 0 0 1 0 0
1 1 0 0 0 0 0 0 0 0 0 0 0 0 1 1
1 1 0 0 0 0 0 0 0 0 0 0 0 0 1 1
```

The second matrix created from the bitmap of each template character is a vertical adjacency matrix. The vertical adjacency matrix represents connectivity of each box with a vertically adjacent box, using a definition of connectivity corresponding to that used in the horizontal adjacency matrix. By convention, the vertical adjacency matrix corresponding to an n×n grid of boxes is of size n-1 rows by n columns, and each element of the matrix represents connectivity of a corresponding box with the box that is immediately adjacent below that box. Thus, the vertical adjacency matrix corresponding to the bitmap of FIG. 3 would be:

```
1 1 0 0 0 0 0 0 0 0 0 0 0 0 1 1
0 0 1 0 0 0 0 0 0 0 0 0 0 1 0 0
0 0 1 1 0 0 0 0 0 0 0 1 1 0 0
0 0 0 0 1 0 0 0 0 0 1 0 0 0 0
0 0 0 0 1 1 0 0 0 1 1 0 0 0 0
0 0 0 0 0 0 1 0 0 1 0 0 0 0 0 0
0 0 0 0 0 0 1 1 1 0 0 0 0 0 0
0 0 0 0 0 0 1 1 1 0 0 0 0 0 0
0 0 0 0 0 0 1 1 1 0 0 0 0 0 0
0 0 0 0 0 0 1 0 0 1 0 0 0 0 0 0
0 0 0 0 1 1 0 0 0 1 1 0 0 0 0
0 0 0 0 1 0 0 0 0 0 1 0 0 0 0
0 0 1 1 0 0 0 0 0 0 0 1 1 0 0
0 0 1 0 0 0 0 0 0 0 0 0 0 1 0 0
1 1 0 0 0 0 0 0 0 0 0 0 0 0 1 1
```

The third matrix created from the bitmap of each template character is a pixel density matrix. The pixel density matrix represents whether each of the boxes is predominantly marked with black or white pixels. If 50% or more of the area of a box is marked with black (i.e., a pixel or pixels having a value of 1), the corresponding matrix entry for that box is assigned a value of 1. Otherwise, the matrix entry is assigned a value of 0. The pixel density matrix for an n×n grid of boxes is n rows by n columns. For the bitmap of FIG. 3, the pixel density matrix is:

```
1 1 1 0 0 0 0 0 0 0 0 0 0 1 1 1
0 1 0 0 0 0 0 0 0 0 0 0 0 0 1 0
0 0 1 1 0 0 0 0 0 0 0 0 1 1 0 0
0 0 0 1 0 0 0 0 0 0 0 1 0 0 0 0
0 0 0 0 1 1 0 0 0 0 1 1 0 0 0 0
0 0 0 0 0 1 0 0 0 0 1 0 0 0 0 0
0 0 0 0 0 0 1 1 1 1 0 0 0 0 0 0
0 0 0 0 0 0 0 1 1 0 0 0 0 0 0 0
0 0 0 0 0 0 0 1 1 0 0 0 0 0 0 0
0 0 0 0 0 0 1 1 1 1 0 0 0 0 0 0
0 0 0 0 0 1 0 0 0 0 1 0 0 0 0 0
0 0 0 0 1 1 0 0 0 0 1 1 0 0 0 0
0 0 0 1 0 0 0 0 0 0 0 1 0 0 0 0
0 0 1 1 0 0 0 0 0 0 0 0 1 1 0 0
0 1 0 0 0 0 0 0 0 0 0 0 0 0 1 0
1 1 0 0 0 0 0 0 0 0 0 0 0 0 1 1
```

It should be recognized that other conventions could be used to define these or other matrices in accordance with the present invention. The matrices described above, however, have been found effective when used with the process described in connection with FIG. 5. One advantage of using this set of matrices is that each of them provides a ranking list from which the best character guess may be selected; in this sense, the matrices are redundant. At the same time, the information on which each of these matrices is based is different, so the matrices are not correlated with one another. For example, the horizontal and vertical matrices are based on directional information that is orthogonal, and the pixel density matrix is not directionally-based at all. Thus, artifacts that may corrupt one matrix may not greatly affect the other two matrices.

The use of such matrices is also advantageous in that characters having various point sizes, styles, and type fonts may often map to similar, if not identical, matrices. For instance, a matrix for a plain 10 point Times Roman font character may be identical to that for a plain 12 point Times Roman font character and may even be virtually identical to a matrix for a bold condensed 14 point Courier font character. Thus, a single set of matrices may often be sufficient for recognition of a given character over a number of type sizes, styles and fonts, and relatively less storage will be required compared with systems in which each font, style and size requires individual data storage.

Once a horizontal adjacency matrix, a vertical adjacency matrix, and a pixel density matrix are created and stored in referent storage 204 of FIG. 2, processing continues by obtaining 502 a bitmap of a sample character, as described above in connection with scanner 102 of FIG. 1 and scanning device 202 of FIG. 2. Then, a minimal bounding frame is determined 503 for the sample character bitmap, as described above in connection with framer 104 of FIG. 1. At this point, a minimally bounded character bitmap such as the bitmap 300 of FIG. 3 is obtained.

Processing then continues by determining 504 a measure of distance from the matrices for the sample character to the corresponding matrices that had been created and stored 501 for each of the template characters. In a preferred embodiment, a Hamming distance is used as the measure of distance. Given two matrices, a template matrix T and a sample matrix S, each matrix being of the same size and each having a total number N elements valued at either 1 (representing black) or 0 (representing white), the number of corresponding elements equal to the value 1 in both T and S being represented by $C_b$, the number of corresponding elements equal to the value 0 in both T and S being represented by $C_w$, a Hamming distance H(T,S) between the template matrix T and the sample matrix S is defined as:

$$H(T,S) = N - (C_b + C_w) \qquad \text{Eq.1}$$

Hamming distances between the sample character and each template character are determined for each of the three horizontal adjacency, vertical adjacency, and pixel density matrices. A single Hamming distance vector in three dimensions is then used to represent the distance between the sample character and any of the template characters.

Processing continues by determining 505 a non-inferior, or Pareto-optimal, set of characters. A template character is said to be non-inferior, or Pareto-optimal, if it cannot be replaced by another template character without increasing at least one component of the corresponding vector of Hamming distances. For example, consider the following hypothetical set of template characters and associated Hamming vectors to a sample character:

| Character | Hamming vector |
|---|---|
| α | (12, 14, 17) |
| γ | (3, 5, 3) |
| δ | (5, 4, 6) |
| ε | (7, 10, 11) |
| ζ | (6, 9, 9) |
| η | (11, 15, 15) |
| θ | (13, 8, 8) |
| ι | (3, 6, 3) |
| κ | (9, 10, 9) |

In this example, candidate characters would be γ and δ.

Assuming that there is no change in character size along a line of text, all the noninferior characters, i.e., the selected candidates, and the associated character images for that line are stored for later processing, as described below, until the end of the line is reached. If character size changes are detected, smaller groupings such as a word or group of words are used rather than full lines.

Because the set of non-inferior candidates may have one or more than one member, a check 506 is next performed to determine whether there is more than one such candidate. If there is only one candidate, that candidate is selected 507 as the recognized character. Otherwise, a check 508 is made to determine whether there are more characters in the line to be processed, i.e., whether the processing just completed was of the last character in the line. If there are more characters to process, the bitmap of another sample character is obtained 502, and processing repeats as described above. If there are no more characters in the line, the characters already recognized in 507 are used to select 509 an appropriate set of tables of geometric parameter values corresponding to the size of the characters in the current line. The selected tables are then used to eliminate 510, for each remaining unrecognized bitmap, character candidates that do not match the expected parameter values as indicated in the tables. If more than one candidate remains, the best remaining character for each still-unrecognized bitmap is selected 511 as the recognized character, based on context. At this point, the entire line has been recognized, and a determination 512 is made as to whether further lines remain to be processed. If so, another bitmap is obtained 502 and processing continues as previously described. Otherwise, processing is complete.

The tables of parameter values discussed above are used to help resolve ambiguities among characters that otherwise would appear nearly identical when represented by adjacency and pixel density matrices, for instance the degree sign ("°") and the numeral zero ("0"). Ambiguities may arise because characters are the same shape, e.g., {c C}, {o O 0}, {p P}, {s S}, {u U}, {v V}, {w W}, {x X}, {y Y}, {z Z}; because they are primarily a single narrow vertical stroke, e.g., {I i l 1 | ! |}; because they are essentially rectangular in shape {– _ | . '}, or because they have some similarity in shape {^ A}.

In a preferred embodiment, three parameters relating to the minimal bounding frame, e.g., frame 301 of FIG. 3, are used to resolve such ambiguities: height, vertical position and aspect ratio.

A set of height tables provides an indication of the relative vertical size of characters. For example, a Courier 10-point font might have capital letters that range from 32–33 pixels in height, non-ascending and non-descending lower case letters that range from 25 to 27 pixels in height, numerals that range from 35 to 36 pixels in height, and special characters that may, either individually or in groups, be categorized as having other height ranges. This information can be used, for example, to determine whether any of the recognition candidates "o","O", or "0" may be discarded in a particular situation.

Similarly, a set of vertical position tables indicates where, relative to other characters on the current line, a minimal bounding frame is vertically located for each of a set of candidate characters. For example, the vertical position of the lower-case letter "p" is lower than that of the upper-case letter "P", so this information may be used to eliminate candidate characters in certain situations.

The aspect ratio of a character may also be used to resolve ambiguities through such parameter tables. For instance, the aspect ratio of the dash character "-" is quite different from that of the underscore character "_", thus providing yet another possible manner to eliminate candidate characters.

Should storage space not be a constraining factor, tables containing individual parameter sets for each possible candidate character may be used. However, to reduce storage space requirements and simplify the structure of such tables, characters may be grouped into categories. For example, in a preferred embodiment, characters are categorized for frame height purposes as being normal, nonambiguous shape, e.g., "a"; normal, ambiguous shape, e.g., "c"; ascending, lower case, e.g., "b"; ascending, upper case, nonambiguous shape, e.g., "B"; ascending, upper case, ambiguous shape, e.g., "C"; ascending, numerals, e.g., "0"; descending, e.g., "g"; ascending-descending, e.g., "j"; special characters (high) , e.g., "$"; special characters (medium), e.g., "*"; special characters (small) , e.g., "–".

Some ambiguous characters may be reliably discriminated only by using more than one of these parameters, as their parameter values may be very close in each of the three measures described above. There may even be some cases where special treatment needs to be given to a set of candidate characters. For example, the characters "i", "l" and "1" in many fonts are so similar that elimination using geometric parameters may not be effective. Where these characters remain together in a candidate set, further checks may be performed to determine, for example, whether the character consists of two connected components, e.g., "i", or only one, e.g., "l", "1".

If none of these techniques is reliable for a particular candidate set, reliance is made on the context-sensitive selection 511 mentioned above. In this selection, each remaining candidate is examined in the context of other surrounding recognized characters, and the candidate that is the most probable in that context is selected as the recognized character. In a preferred embodiment, a candidate is compared only in context with one preceding character and one subsequent character, but it should be recognized that other comparisons for context could also be used. Context-based selection 511 may be implemented using a fixed database of probabilities, by developing a dynamic database that is particular to a document currently being processed, or by adaptive modification of a fixed database as processing continues.

Therefore, pattern recognition is achieved by defining a minimal bounding rectangle around a pattern, dividing the pattern into a grid of boxes, comparing a vector derived from this partitioned pattern to vectors similarly derived from known patterns, choosing a set of Pareto non-inferior candidate patterns, and selecting a recognized pattern from the set of candidates.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

We claim:

1. A computer-implemented process for recognizing a pattern in an image among a set of known templates, the process comprising the steps of:

a) partitioning each of said known templates into an n×n grid of boxes;

b) determining, for each of said known templates, a vertical adjacency matrix indicating vertical connectivity of said boxes, a horizontal adjacency matrix indicating horizontal connectivity of said boxes, and a pixel density matrix indicating pixel density in each of said boxes;

c) extracting a detected pattern from said image by applying a minimal bounding frame to said image;

d) partitioning said detected pattern into said n×n grid of boxes;

e) determining, for said detected pattern, said vertical adjacency matrix, said horizontal adjacency matrix, and said pixel density matrix;

f) comparing said vertical adjacency matrix, horizontal adjacency matrix, and pixel density matrix for said detected pattern respectively with said vertical adjacency matrix, horizontal adjacency matrix, and pixel density matrix for each of said known templates;

g) determining a Hamming distance vector between said detected pattern and each of said known templates based on the results of step f;

h) choosing a set of candidates from said set of templates based on Pareto non-inferiority of said Hamming distance vector between said detected pattern and said candidate;

i) recognizing, responsive to said set of candidates including only one candidate, said image as corresponding to said one candidate;

j) recognizing, responsive to said set of candidates including a plurality of candidates, said image as corresponding to one of said plurality of candidates by eliminating candidates from said set based on geometric properties of said minimal bounding frame and i) recognizing, responsive to a single candidate remaining in said set of candidates, said image as corresponding to said single candidate; and ii) recognizing, responsive to a plural number of candidates remaining in said set of candidates, said image as corresponding to a selected one of said plural candidates most likely to occur in context with at least one adjacent recognized image.

2. Apparatus for recognizing a pattern in an image among a set of known templates, the apparatus comprising:

- a framer adapted to accept as input said image and producing therefrom a detected pattern, said detected pattern being confined within a minimal bounding frame;
- a matrix processor adapted to accept as input said detected pattern and producing therefrom a matrix characterizing said detected pattern;
- a Hamming processor adapted to accept as input said matrix characterizing said detected pattern, said Hamming processor having access to matrices characterizing each of said templates, said Hamming processor producing a set of distance metrics between said detected pattern and each of said templates; and
- a Pareto processor adapted to accept as input said distance metrics and producing therefrom a signal indicating recognition of said image as corresponding to a selected one of said templates.

3. The process of claim 1 wherein said image is an output of a scanning device.

4. The apparatus of claim 2 wherein said image is an output of a scanning device.

5. Apparatus as in claim 2, wherein said detected pattern is subdivided into n×n boxes and wherein said matrix is a matrix indicating connectivity of said boxes.

6. Apparatus as in claim 5, wherein said matrix processor further produces a pixel density matrix indicating pixel density in each of said boxes.

7. Apparatus as in claim 2, wherein said Pareto processor selects from said templates a set of candidates based on Pareto non-inferiority of said distance metrics; and chooses said selected one of said templates from said set of candidates.

8. Apparatus as in claim 7, wherein said Pareto processor chooses said selected one of said templates from said set of candidates by eliminating candidates based on geometric properties of said minimal bounding frame.

9. Apparatus as in claim 7, wherein said Pareto processor chooses said selected one of said templates from said set of candidates by comparing probabilities of occurrence of each candidate based on adjacent recognized images.

* * * * *